US009143486B2

(12) United States Patent
Tanaka et al.

(10) Patent No.: US 9,143,486 B2
(45) Date of Patent: Sep. 22, 2015

(54) COMMUNICATION DEVICE, COMMUNICATION METHOD AND COMPUTER PROGRAM (71) Applicant: Kabushiki Kaisha Toshiba, Minato-ku (JP)

(72) Inventors: Yasuyuki Tanaka, Chigasaki (JP); Mitsuru Kanda, Tokyo (JP); Seijiro Yoneyama, Yokohama (JP); Yoshiki Terashima, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/088,626

(22) Filed: Nov. 25, 2013

(65) Prior Publication Data
US 2014/0157386 A1 Jun. 5, 2014

(30) Foreign Application Priority Data

Nov. 30, 2012 (JP) ................................. 2012-262771

(51) Int. Cl.
G06F 15/16 (2006.01)
H04L 29/06 (2006.01)

(52) U.S. Cl.
CPC ........ *H04L 63/0428* (2013.01); *H04L 63/0464* (2013.01); *H04L 63/123* (2013.01); *H04L 63/162* (2013.01)

(58) Field of Classification Search
CPC .................................................. H04L 63/0428
USPC ............................................................ 726/7
See application file for complete search history.

(56) References Cited

U.S. PATENT DOCUMENTS

| 7,334,125 | B1* | 2/2008 | Pellacuru ....................... 713/163 |
| 2004/0139322 | A1* | 7/2004 | Kaler et al. ................... 713/170 |
| 2006/0072745 | A1* | 4/2006 | Fukaya ........................... 380/28 |
| 2013/0227157 | A1 | 8/2013 | Tanaka |
| 2013/0227173 | A1 | 8/2013 | Tanaka et al. |
| 2014/0044168 | A1* | 2/2014 | Seregin et al. ........... 375/240.12 |

FOREIGN PATENT DOCUMENTS

| JP | 2004-289257 | 10/2004 |
| JP | 2006-80628 | 3/2006 |

* cited by examiner

*Primary Examiner* — Mohammad W Reza
(74) *Attorney, Agent, or Firm* — Oblon, McClelland, Maier & Neustadt, L.L.P.

(57) ABSTRACT

According to one embodiment, there is provided a communication device including a first communication layer receiving processor to perform a receiving process on a first communication layer on data received from a first communication device. The first communication layer receiving processor includes a first key identifying unit to identify, a key required to process the data; a first attribute identifying unit to identify, pursuant to key data, first attribute information that is attribute information associated with the key as identified; and a data processor to process the data using the key as identified. The data processed by the data processor and the first attribute information are passed to a second communication layer processor configured to perform a process on a second communication layer.

12 Claims, 7 Drawing Sheets

COMMUNICATION DEVICE, COMMUNICATION METHOD AND COMPUTER PROGRAM

CROSS REFERENCE TO RELATED APPLICATIONS

This application is based upon and claims the benefit of priority from the prior Japanese Patent Application No. 2012-262771 filed on Nov. 30, 2012, the entire contents of which are incorporated herein by reference.

FIELD

Embodiments described herein relate to a communication device, a communication method and a computer program.

BACKGROUND

Conventionally, a method has been known that refers to identification information included in received data, and determines the process on the received data. This method has a problem of being inapplicable if a communication layer on which an encrypting (decrypting) process is performed is different from a communication layer on which the process on the received data is determined.

Another method has also been known that determines the content of a process on received data on the basis of a MAC address or an IPv6 address. Unfortunately, each address can be spoofed, this method has a security problem in the case of use for a smart meter.

DETAILED DESCRIPTION

According to one embodiment, there is provided a communication device including a first communication layer receiving processor to perform a receiving process on a first communication layer on data received from a first communication device. The communication device includes a first key identifying unit, a first attribute identifying unit and a data processor.

The first key identifying unit identifies a key required to process the data.

The first attribute identifying unit identifies first attribute information that is attribute information associated with the key identified by the first key identifying unit pursuant to key data that represents association between a key and attribute information.

The data processor processes the data using the key identified by the first key identifying unit.

The data processed by the data processor and the first attribute information are passed to a second communication layer processor configured to perform a process on a second communication layer.

Hereinafter, embodiments will be described with reference to the accompanying drawings.

Figure 1:
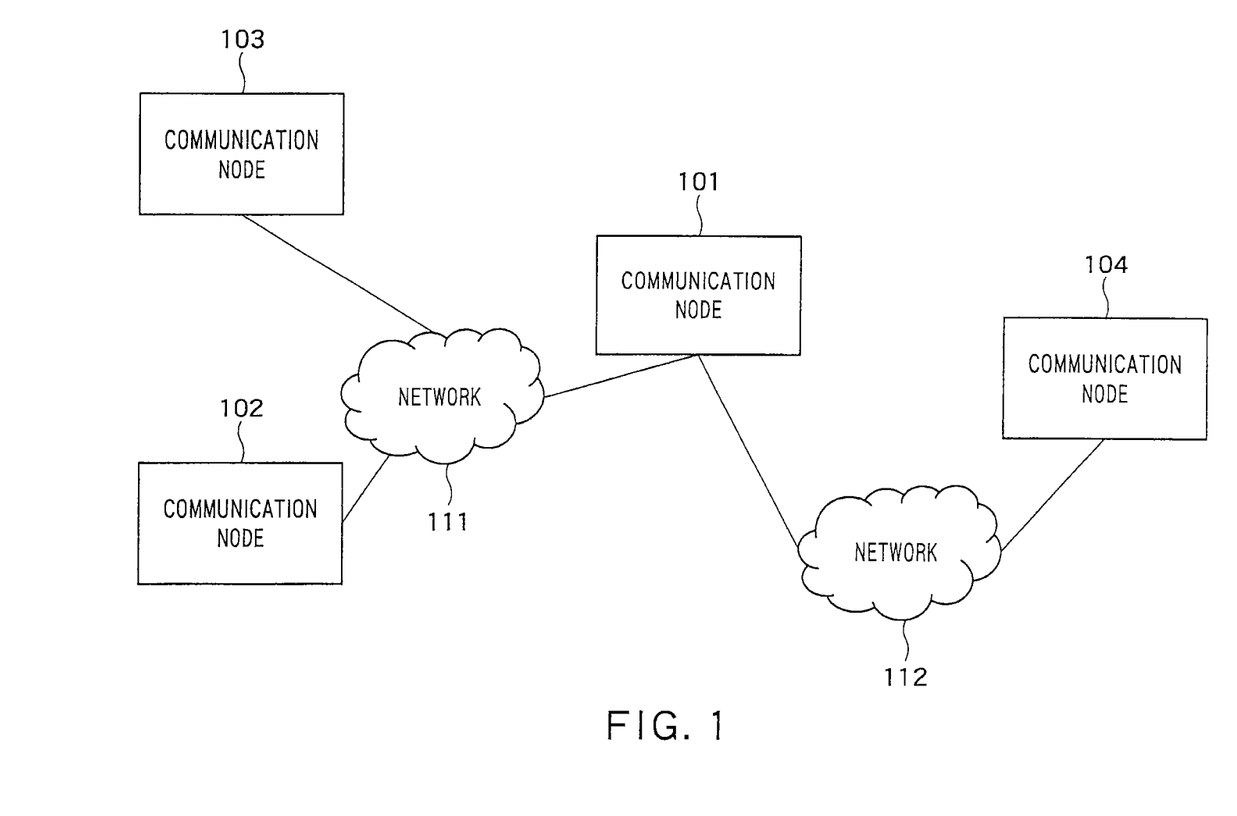
FIG. 1 is a diagram showing an example of a network configuration including a communication device according to an embodiment.

FIG. 1 shows a network configuration including a communication device according to an embodiment.

A communication node 101, which is a communication device according to this embodiment, is connected to a network 111. Furthermore, a communication node 102 and a communication node 103 are connected to the network 111. The communication node 102 and the communication node 103 are incapable of directly communicating with each other, but communicate via the communication node 101. The communication node 101 and a communication node 104 are connected to a network 112. The communication node 101 controls transfer of packets so that the communication node 104 cannot communicate with the communication node 102 and the communication node 103. That is, the communication node 101 operates so as to block communication between the network 111 and the network 112.

The network 111 and the network 112 may be configured by wired connection, such as the Ethernet or power line communication, or wireless connection, such as wireless LAN or low power radio. Here, a case is exemplified where the network 111 and the network 112 use the same wireless communication protocol and the same wireless channel, and have the same network identifier. That is, the case is discussed where the network 111 cannot be discriminated from the network 112 on the data link layer in the OSI reference model (the network interface layer in the TCP/IP four-layer network model). In particular, the case is assumed where the communication node 101 is connected to the network 111 and the network 112 via a single communication interface (physical interface). It is also assumed that a frame is encrypted in the data link layer, or authentication data is added to a frame, or both assumptions are satisfied. In this embodiment, the case is discussed where a frame is encrypted and authentication data is added thereto. It can be assumed that the communication nodes 101, 102 and 103 are, for instance, smart meters, and the communication node 104 is a communication device (e.g., an HEMS or a gas meter) subordinate to the communication node 101.

As described above, the communication node 101 should transfer a packet between the communication node 102 and the communication node 103, but block packet transfer between the network 111 and the network 112. Thus, it should be discriminated whether a packet received by the communication node 101 is transmitted by a communication node connected to the network 111 or a communication node connected to the network 112.

Figure 2:
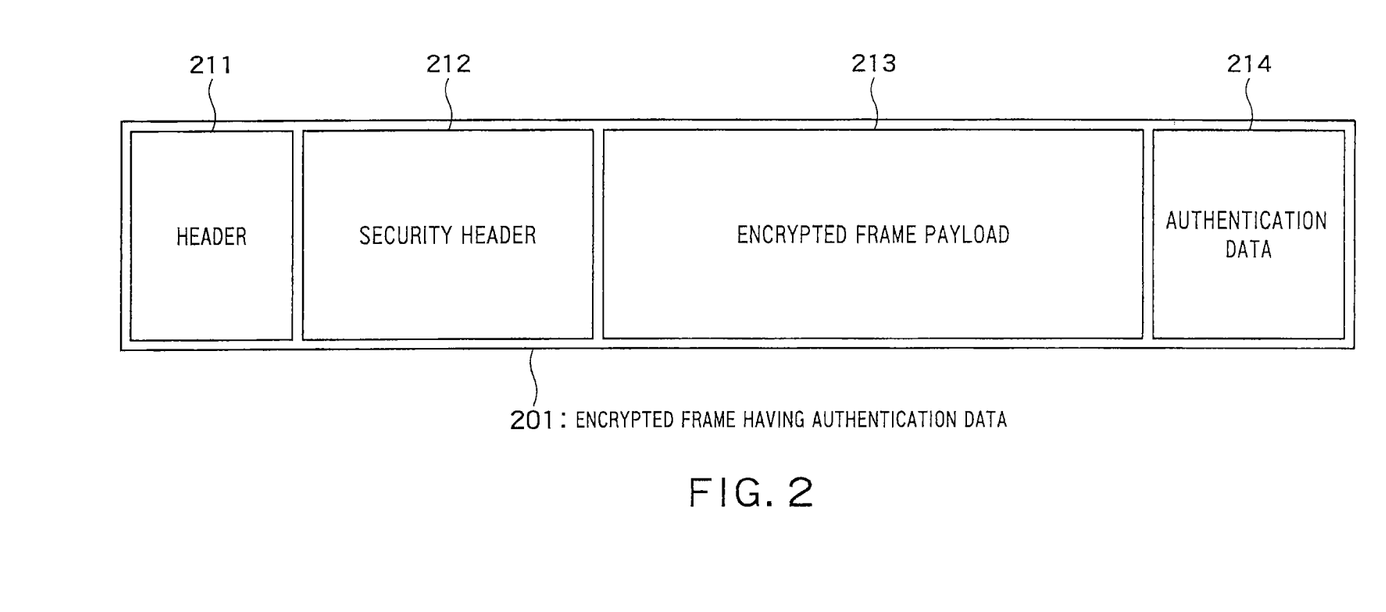
FIG. 2 is a diagram showing a configuration of an encrypted frame having authentication data.

FIG. 2 shows an example of a configuration of a frame (data) transmitted from each communication node to the communication node 101. This frame is an encrypted frame 201 having authentication data, and includes a header 211, a security header 212, and an encrypted frame payload 213, and authentication data 214.

The header 211 includes header elements, such as a source address, a destination address, and a network identifier. The header element is not encrypted, and applied also to a normal frame that is not to be encrypted.

The security header 212 designates that a security process on the frame is only encryption, or only addition of authentication data, or both thereof. The security header 212 also designates algorithms used for processes of encryption and authentication data generation. The security header 212 includes information, such as information required to identify a key used for the security process on the frame, key generator information, a key identifier, and a frame counter. In some possible communication schemes and settings, the security header 212 is not included. The information included in the security header is not limited that described here.

The encrypted frame payload 213 is a payload encrypted on the basis of the algorithms and the key, which are designated by the security header 212, and the header 211.

The authentication data 214 is generated on the basis of the algorithms and the key, which are designated by the security header 212, the header 211 and the payload.

In the case of an encrypted frame that includes no authentication data, the security header 212 includes designation that only encryption is performed, and the encrypted frame does not include the authentication data 214. In the case of a plain frame including the authentication data, the security header 212 includes designation that only the authentication data is included. In this case, the encrypted frame payload 213 in FIG. 2 is replaced with a plain payload.

Figure 3:
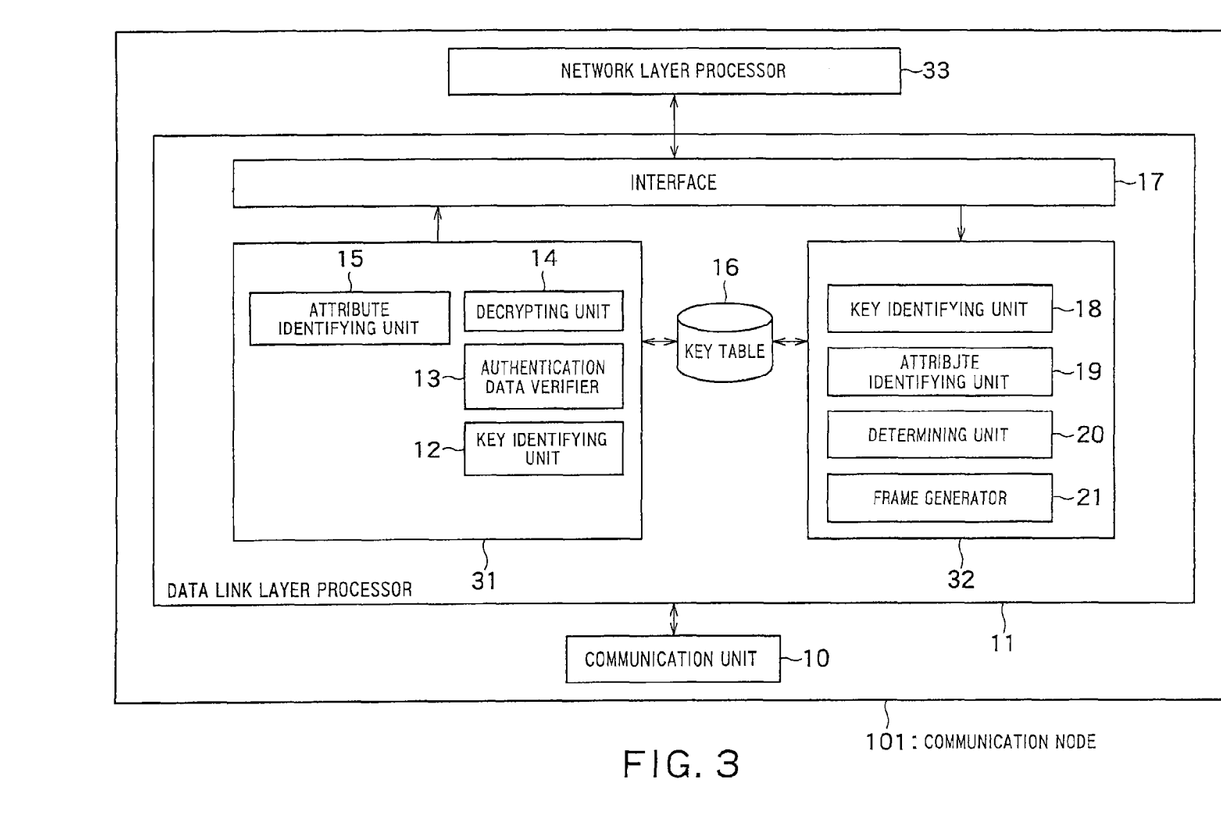
FIG. 3 is a diagram showing an example of a configuration of a communication device according to the embodiment.

FIG. 3 shows the configuration of the communication node 101.

The communication node 101 includes a communication unit 10, a data link layer processor 11, and a network layer processor 33. Furthermore, this node may include an application layer processor, which is not shown.

The communication unit 10 receives data (frame) from another communication node via a network. The communication unit 10 performs processes that include a process in the physical layer, on the frame, and transmits the processed frame to the data link layer processor 11.

The data link layer processor 11 includes a data link layer receiving processor 31 (first communication layer receiving processor), a data link layer transmitting processor 32 (first communication layer transmitting processor), various tables that include a key table (key data) 16, and an interface 17.

The data link layer receiving processor 31 includes a key identifying unit 12, an authentication data verifier 13, a decrypting unit 14, and an attribute identifying unit 15.

The key identifying unit 12 identifies a key to be used for processing the frame received from the communication unit 10, on the basis of information of this frame and the key table 16. The key table 16 associates a search key, a key value, and attribute information with each other. The search key is extracted or derived from information of the received frame. The key associated with the search key is identified from the key table 16.

The authentication data verifier 13 verifies the authentication data included in the received frame, using the key identified by the key identifying unit 12. The decrypting unit 14 decrypts the received frame, using the key identified by the key identifying unit 12. The authentication data verifier 13 and the decrypting unit 14 correspond to a frame processor (data processor) that processes the received frame.

The attribute identifying unit 15 identifies the attribute of the received frame on the basis of the key table 16. More specifically, the attribute associated with the key identified by the key identifying unit 12 (or the search key) is retrieved from the key table 16, thereby identifying the attribute. The interface 17 transmits the data decrypted by the decrypting unit 14 and the attribute information identified by the attribute identifying unit 15 to the network layer processor 33.

In the case where the received frame includes no authentication data and is not encrypted, identification of the key and the attribute may be omitted. In this case, the attribute of the received frame is treated as unknown.

The network layer processor 33 performs a process on the network layer in the OSI reference model (the internet protocol layer in the TCP/IP four-layer network model). If the destination IP address of the data received from the data link layer processor 11 is the own device, the network layer processor 33 identifies a data processing method according to the attribute information received from the data link layer processor 11. The network layer processor 33 processes the data according to the identified processing method. For instance, this processor passes the data to a receiving process according to the transport protocol in use, and subsequently passes the data to an application according to a port number, or discards the data. The data processing method can be identified, for instance, by identifying a data processing method according to the attribute received from the data link layer processor 11 on the basis of the packet processing policy (policy data) representing association between the data processing method and the attribute.

If the destination IP address of the data received from the data link layer processor is another communication device, the network layer processor 33 performs a process on the network layer that is required for the data. The processed data and the attribute information received from the data link layer processor 11 are transmitted to the data link layer transmitting processor 32.

The data link layer transmitting processor 32 includes a key identifying unit 18, an attribute identifying unit 19, a determining unit 20, and a frame generator 21.

The key identifying unit 18 identifies a key used for communication with another communication device to which the frame is destined. For instance, the identification can be performed using an after-mentioned key selection table (a search key, a key value, and security type). The security type indicates that any or both of encryption and authentication are performed. The search key is generated on the basis of, for instance, the data link layer address of the other communication device.

The attribute identifying unit 19 identifies the attribute information associated with the key identified by the key identifying unit 18, according to the key table 16.

The determining unit 20 determines a process to be performed on the data received from the network layer processor 33, on the basis of the relationship between the attribute information received from the network layer processor 33 and the attribute information identified by the key identifying unit 18. For instance, it is determined whether to transfer the data to the other communication device having the destination IP address or not. The determination can be performed according to the packet processing policy (policy data) that represents, for instance, association among the source attribute information, the destination attribute information, and the data processing method. In this embodiment, the case of determining whether to allow transmission or not is assumed as the data processing method. The frame generator 21 performs any or both of data encryption and authentication data generation on the basis of the identified key, as necessary. The frame generator 21 generates the header, the security header and the like, also generates an encrypted frame having the authentication data using the generated header and security header, the encrypted data and the authentication data, and passes the frame to the communication unit 10. The communication unit 10 transmits the frame.

Figure 7:
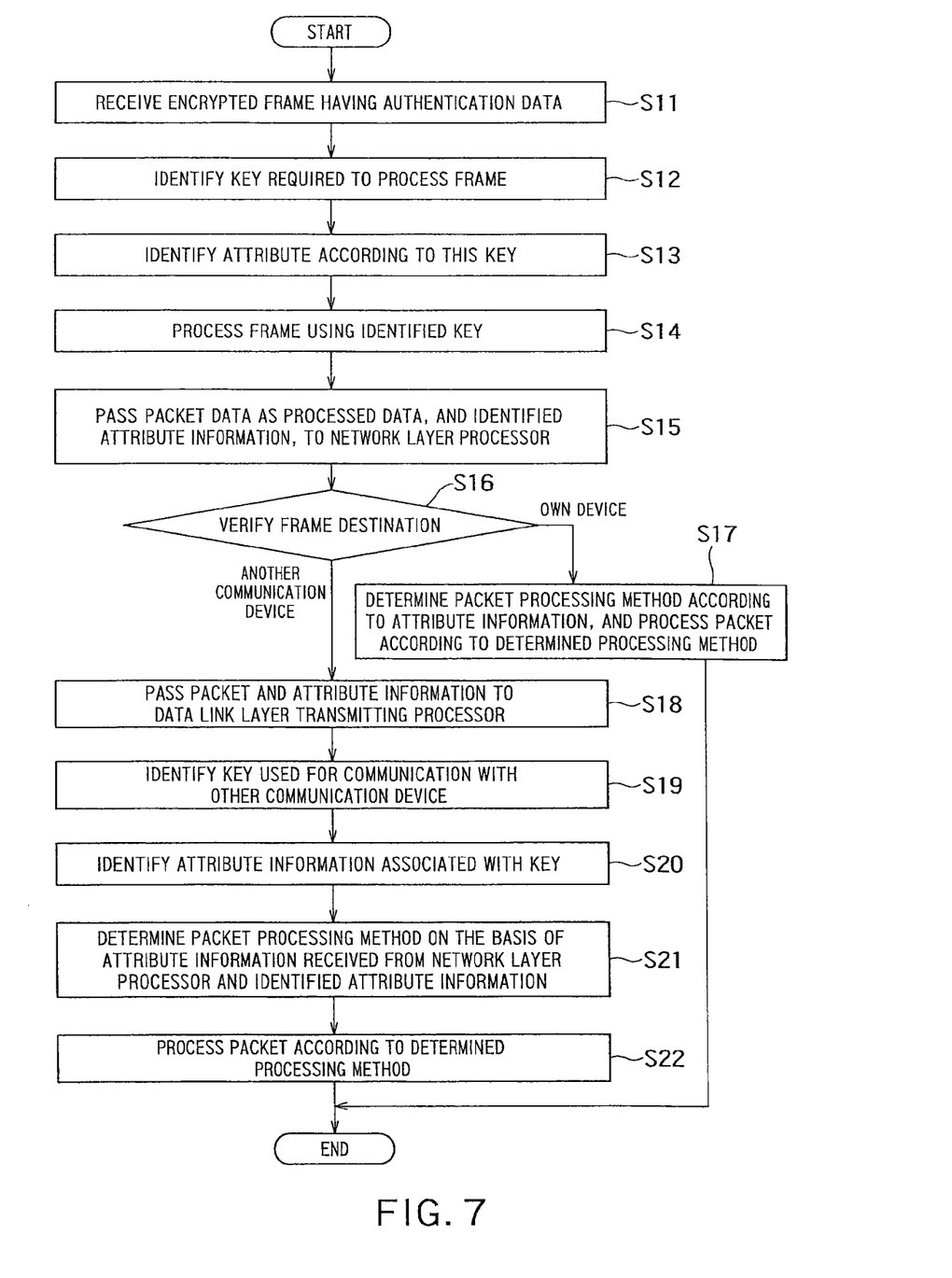
FIG. 7 is a flowchart showing an example of a flow of the communication device according to the embodiment.

FIG. 7 is a flowchart schematically showing an example of an operation of the communication device in FIG. 3.

When the communication unit 10 receives the encrypted frame having the authentication data (S11), the data link layer receiving processor 31 generates a search key for the frame received from the communication unit 10 on the basis of the frame information, and identifies the key required to process the frame, with reference to the key table 16, which includes the search key, the key and the attribute information (S12). The attribute according to this key is then identified (S13). The data link layer receiving processor 31 verifies the authentication data included in the frame using the identified key, and decrypt the encrypted frame payload (S14). If the verification of the authentication data or the encryption of the frame payload fails, the frame is discarded. The data link layer receiving processor 31 passes the packet that is decrypted data, and the identified attribute information, to the network layer processor 33 via the interface 17 (S15).

If the frame is destined to the own device, the network layer processor 33 determines the packet processing method, according to the packet processing policy on the network layer and the attribute information; the determination is whether to receive or discard the packet (S16 and S17). If the frame is destined to another communication device, the processor passes the packet and the attribute information to the data link layer transmitting processor 32 (S16 and S18).

The data link layer transmitting processor 32 identifies the key used for communication with this other communication device (S19), and identifies the attribute information associated with the key, with reference to the key table 16 (S20). The packet processing method (e.g., whether to transfer the packet to this other communication device or not) is performed on the basis of the attribute information received from the network layer processor 32 and the identified attribute information, pursuant to the packet processing policy on the data link layer (S21). The packet is processed pursuant to the determined processing method (S22). For instance, if transfer to the other communication device is determined, encryption, authentication data generation and the like are performed on the basis of the packet, the identified key and the like, as necessary, and a frame is constructed. The frame is then transmitted to this other communication device.

Hereinafter, on the basis of a specific example, this communication device is described further in detail.

Upon receiving the encrypted frame 201 having authentication data, the communication node 101 identifies the key for performing a process of receiving the encrypted frame 201, from information of the header 211 and the security header 212. The search key for identifying the key can be generated according to any of various methods, such as a generating method using a set of the source address and the destination address included in the header, a generating method of further adding the network identifier to these addresses, and a method of further adding the key identifier. In any method, the pieces of information included in the received encrypted frame 201 having authentication data are combined, the search key is generated, and the key is identified.

In this embodiment, the case is described that combines the source address included in the encrypted frame 201 having authentication data and the key identifier, and generates the search key for identifying the key. Table 1 shows an example of the key table included in the communication node 101. In this example, the key table has three columns, which are for the search key, the key, and the attribute. Keys used with the communication nodes 102 to 104 are registered, respectively.

TABLE 1

| First example of key table | | |
|---|---|---|
| Search key (address, key identifier) | Key | Attribute |
| 02:22:22:22:22:22, 432 | afdc0923a29f7247 | Network 111 |
| 02:33:33:33:33:33, 200 | f2fd26f4c27b5948 | Network 111 |
| 02:44:44:44:44:44, 104 | a63f7dc74e19788c | Network 112 |

In the "Search key" column, combinations of addresses and keys are registered. Here, it is defined that the link layer address of the communication node 102 is "02:22:22:22:22:22", the link layer address of the communication node 103 is "02:33:33:33:33:33", and the link layer address of the communication node 104 is "02:44:44:44:44:44".

In the "Key" column, the values of keys are registered. Each key included in Table 1 is shared between the communication node 101 and each communication node. That is, the communication node 101 and the communication node 102 share the key "afdc0923a29f7247" associated with the key identifier "432".

In the "Attribute", the attributes of communication nodes sharing the keys are registered. In this example, in the "Attribute", the identifiers of the network 111 and the network 112 are registered as information on the networks to which the communication nodes are connected.

The information in the key table may be statically or dynamically set with respect to the communication node 101. The dynamically setting methods may be various methods, which are a setting method according to a key exchange protocol between the communication nodes, a setting method by an external communication node through a management protocol, and a method of setting a key notified from an authentication server when network-access authentication is performed for the communication node.

Upon receiving the encrypted frame 201 having authentication data, the communication node 101 generates a search key, searches the key table and acquires the key. If no key is acquired, the frame is discarded.

If the key is acquired, the authentication data is successfully authenticated and the encrypted frame is correctly decrypted, the attribute (the identifier of the network) associated with the key in use is identified. On the basis of the attribute, it can be determined from which network the frame is transmitted. For instance, in the case where the search key is "02:22:22:22:22:22, 432", the key is "afdc0923a29f7247". If the encrypted frame is correctly decrypted using this key, it can be determined that the encrypted frame is transmitted from the network 111.

The communication node 101 passes the packet included in the decrypted frame payload, and the identified attribute information, to a receiving processor in the network layer processor 33.

If the received packet is destined to the own address, the receiving processor in the network layer processor 33 determines a process to be performed on the packet, according to packet processing policy on the network layer shown in Table 2.

TABLE 2

Packet processing policy on network layer

| Source | Destination | Policy |
|---|---|---|
| Network 112 | Application 1 | Accept |
| Network 112 | Other than application 1 | Deny |
| Network 111 | All applications | Accept |

That is, the network layer processor 33 controls the process for the case where the received packet is destined to the address of this device. In this case, the process to be performed on the received packet is determined in consideration of not only the address and port number that are included in the packet header and the like, but also the attribute information acquired from the data link layer processor 11 together with the packet. In the example in Table 2, if the source attribute is "network 111", the data of the received packet is passed to the application indicated by the port number. If the source attribute is "network 112", and the port number indicates what is other than "application 1", the received packet is discarded.

In contrast, if the received packet is not destined to the address of this device, it is determined that the received packet is transferred to another communication node. When it is determined that the received packet is transferred, not only the packet to be transferred but also the attribute information acquired from the data link layer receiving processor 31 in reception of the packet is notified to the data link layer transmitting processor 32.

The data link layer transmitting processor 32 identifies the destination address on the data link layer on the basis of the destination address (destination IP address) of the packet. This identification is based on a table in which IP addresses and respective data link layer addresses (MAC addresses) are associated in advance with each other and held. The key used for transmitting the frame is identified on the basis of a key selection table of Table 3 and the key table of Table 1.

TABLE 3

Key selection table

| Destination address | Key search key (address, key identifier) | Security type |
|---|---|---|
| 02:22:22:22:22:22 | 02:22:22:22:22:22, 432 | Encryption, authentication |
| 02:33:33:33:33:33 | 02:33:33:33:33:33, 200 | Authentication |
| 02:44:44:44:44:44 | 02:44:44:44:44:44, 104 | Encryption |

The key selection table stores key search keys associated with the respective destination addresses as keys. In the case where the packet destination address on the data link layer is "02:33:33:33:33:33", the key search key identified by the key selection table is "02:33:33:33:33:33, 200". The data link layer transmitting processor 32 searches the key table using the key search key and acquires the key. The processor further acquires the attribute information associated with the key search key or the key.

In this example, the key search key is "02:33:33:33:33:33, 200". Accordingly, the attribute acquired therefrom is "network 111". The data link layer transmitting processor 32 determines whether to allow to transfer the packet or not, by referring to the packet processing policy on the data link layer, using the attribute information acquired here and the attribute information received from the network layer processor 33. Table 4 shows the packet processing policy on the data link layer.

TABLE 4

Packet processing policy on data link layer

| Source | Destination | Policy |
|---|---|---|
| Network 111 | Network 111 | Accept |
| Network 111 | Other than network 111 | Deny |
| Network 112 | Network 112 | Accept |
| Network 112 | Other than network 112 | Deny |
| Own node | All networks | Accept |

In this example, the attribute information passed from the network layer processor 33 indicates the network 111, and the attribute identified by the data link layer transmitting processor 32 is also the network 111. This means that the frame transmitted from the network 111 is to be transmitted to the network 111. According to Table 4, this process is enabled. Thus, the data link layer transmitting processor 32 construct a transmission frame using the identified key according to the security type of the key selection table, and transmits the frame to the destination.

In the case of transmission of a frame destined to another node from the own node (the case where the source IP address is the own device) instead of transfer of a frame received from another communication node, the network layer processor 33 notifies, to the data link layer transmitting processor 32, the attribute information including that the packet is from the own node, together with the transmission packet. Processes thereafter are analogous to those described above.

Figure 4:
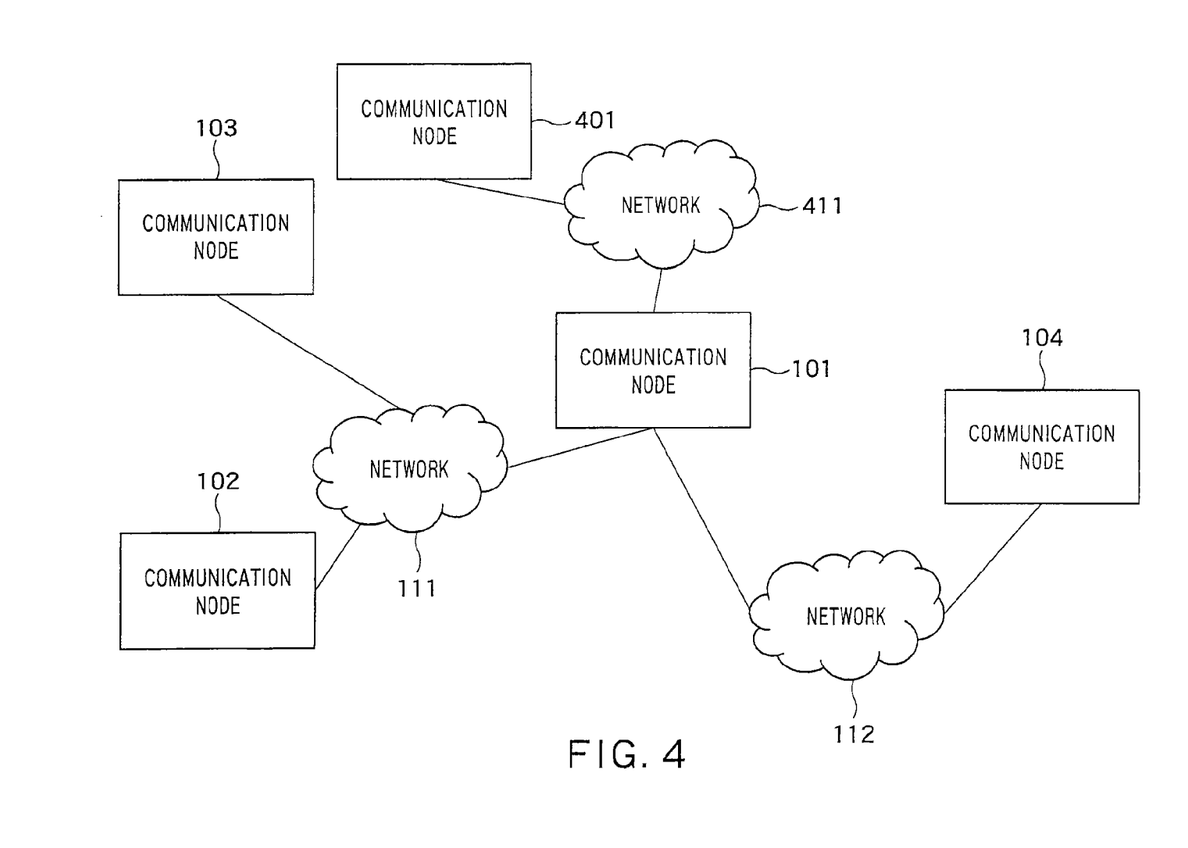
FIG. 4 is a diagram showing another example of the network configuration.

FIG. 4 shows another example of the network configuration. A network 411 and a communication node 401 are added. The communication node 101 and the communication node 401 are connected to the network 411. The communication node 101, the communication node 104 and the communication node 401 may be, for instance, smart meters.

Table 5 shows the second example of the key table held in the communication node 101 in the network configuration example in FIG. 4. Also in this case, the communication node 101 can identify the network to which the transmission source of the frame belongs.

TABLE 5

Second example of key table

| Search key (address, key identifier) | Key | Attribute |
|---|---|---|
| 02:22:22:22:22:22, 432 | afdc0923a29f7247 | Network 111 |
| 02:33:33:33:33:33, 200 | f2fd26f4c27b5948 | Network 111 |
| 02:44:44:44:44:44, 104 | a63f7dc74e19788c | Network 112 |
| 02:40:14:01:40:1:4, 901 | cfb8b5c582661759 | Network 411 |

Table 6 shows the third example of the key table in the case where the communication node 102 and the communication node 103 use the same key in the network configuration of FIG. 4.

In the example in Table 6, the search key is a set of the frame source address and the key identifier, or a set of the address of the node generating the key and the key identifier. In the case of the communication node 102 and the communication node 103, the set is of the address of the node generating the key and the key identifier.

The security header 212 indicates which set is to be used to construct the search key. Information required to construct the search key can be acquired from the encrypted frame 201 having authentication data.

TABLE 6

Third example of key table

| Search key | Key | Attribute |
|---|---|---|
| 02:11:11:11:11:11, 311 | 3895cc40e26119f8 | Network 111 |
| 02:44:44:44:44:44, 104 | a63f7dc74e19788c | Network 112 |
| 02:40:14:01:40:1:4, 901 | cfb8b5c582661759 | Network 411 |

Here, Table 7 shows a fourth example of the key table in the case where the communication node 102 and the communication node 103 use different keys for a multicast message and a unicast message in the network configuration of FIG. 4. Here, broadcast is regarded as a form of multicast.

In this case, when the communication node 102 and the communication node 103 transmit a multicast message onto the network 111, a key "3895cc40e26119f8" is used; for transmission of the unicast message to the communication node 101, a key "afdc0923a29f7247" and a key "f2fd26f4c27b5948" are used.

TABLE 7

Fourth example of key table

| Search key | Key | Attribute |
|---|---|---|
| 02:11:11:11:11:11, 311 | 3895cc40e26119f8 | Network 111 |
| 02:22:22:22:22:22, 432 | afdc0923a29f7247 | Network 111 |
| 02:33:33:33:33:33, 200 | f2fd26f4c27b5948 | Network 111 |
| 02:44:44:44:44:44, 104 | a63f7dc74e19788c | Network 112 |
| 02:40:14:01:40:1:4, 901 | cfb8b5c582661759 | Network 411 |

Table 8 shows the fifth example of the key table in which an attribute other than the network type is set in the "Attribute" in the key table. In this example, the communication node holding the key can be identified, the user of the communication node can be identified, and the geographical position on which the communication node is disposed can be identified.

TABLE 8

Fifth example of key table

| Search key (address, key identifier) | Key | Attribute |
|---|---|---|
| 02:22:22:22:22:22, 432 | afdc0923a29f7247 | Communication node 102 |
| 02:33:33:33:33:33, 200 | f2fd26f4c27b5948 | User A |
| 02:44:44:44:44:44, 104 | a63f7dc74e19788c | C district |

Thus, setting of various attributes in the key table allows the packet processing policy to be flexibly set. For instance, control of communication between users, and separation of communication in a specific district can be securely performed.

Table 9 shows the sixth example of the key table that further includes a setting item relating to communication using each key.

TABLE 9

Sixth example of key table

| Search key | Key | Attribute | Communication setting |
|---|---|---|---|
| 02:11:11:11:11:11, 311 | 3895cc40e26119f8 | Network 111 | Channel 1 |

TABLE 9-continued

Sixth example of key table

| Search key | Key | Attribute | Communication setting |
|---|---|---|---|
| 02:22:22:22:22:22, 432 | afdc0923a29f7247 | Network 111 | Channel 1 |
| 02:33:33:33:33:33, 200 | f2fd26f4c27b5948 | Network 111 | Channel 1 |
| 02:44:44:44:44:44, 104 | a63f7dc74e19788c | Network 112 | Channel 2, low communication frequency |
| 02:40:14:01:40:1:4, 901 | cfb8b5c582661759 | Network 411 | Channel 3, intermediate communication frequency |

In this case, the communication node 101 uses "channel 1" for communication with "network 111" with reference to communication setting in Table 9. The communication node 101 uses "channel 2" for communication with "network 112", and performs control so as to communicate at a frequency preset as "low communication frequency". This is also applicable to the network 411.

Communication items set in the key table are not only information on the channel (frequency) used for communication and a communication frequency but also various items, such as a logical network name (e.g., PANID or ESSID), communication rate setting, an upper limit of the communication rate, and a frequency hopping pattern.

Upon receiving the frame, the communication node 101 determines whether the frame is received according to a communication condition matching with the communication setting or not. When the communication node 101 transmits the frame, this node processes the frame according to the communication setting associated with the key used for encrypting the frame and transmits the frame.

Figure 5:
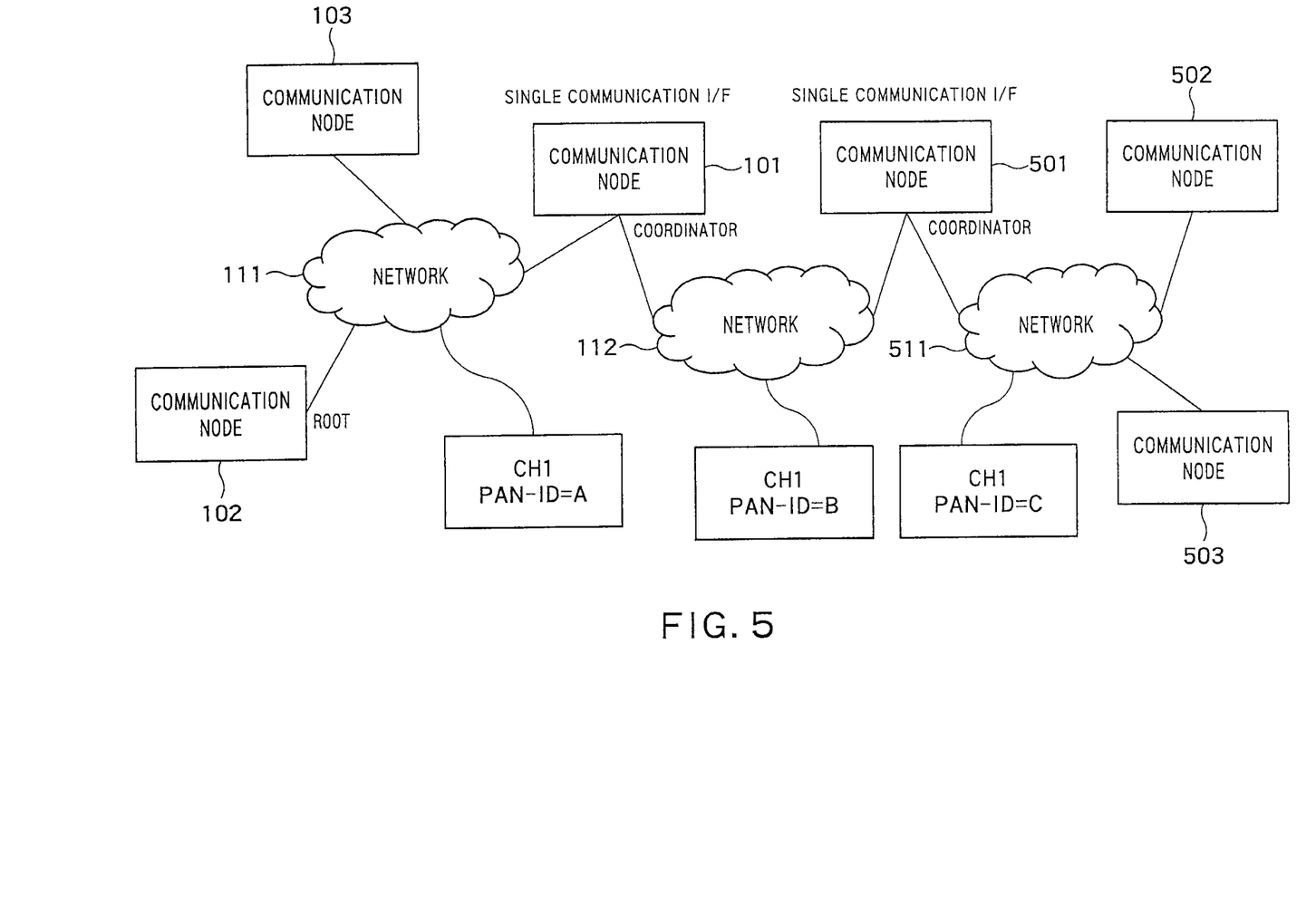
FIG. 5 is a diagram showing a still another example of the network configuration.

The aforementioned embodiments have exemplified the case where the communication node 101 is connected to the network 111 and the network 112 in a single communication interface (physical interface). Here, as shown in FIG. 5, a case is exemplified where one communication node (101, 501) is connected to two (or more) networks via a single communication interface, and the communication nodes (101, 501) are connected to each other via the same network (112).

The network 111 and the communication nodes 101, 102 and 103 are analogous to those in FIG. 1 or 4. As with FIG. 1 or 4, the communication node 101 is connected to the network 112 via the physical communication interface identical to that of the network 111. The communication node 101 controls packet transfer so that the node (e.g., communication node 501) connected to the network 112 and the node (e.g., communication node 102) connected to the network 111 cannot directly communicate with each other. That is, the communication node 101 operates so as to block communication between the network 111 and the network 112.

Likewise, the communication node 501 is connected also to the network 511 via the physical communication interface identical to that of the network 112. The communication node 501 controls packet transfer so that the node (e.g., communication node 101) connected to the network 112 and the node (e.g., communication nodes 502 and 503) connected to the network 511 do not communicate with each other. That is, the communication node 501 operates so as to block communication between the network 112 and the network 511.

The network 111 and the network 112, or the network 112 and the network 511 communicate with each other according to the same network protocol (e.g., wireless communication protocol), and the wireless channel used here may be the same. In the example in FIG. 5, in the networks 111, 112 and 511, communication is performed according to the same network scheme, and every wireless channel in use is the same. The wireless channel is defined as "CH1".

The network 111 and the network 112, or the network 112 and the network 511 may have network identifiers (e.g., PAN-ID in IEEE802.15.4) different from each other. In the example in FIG. 5, the network 111 has a "PAN-ID" of "A", the network 112 has a "PAN-ID" of "B", and the network 511 has "PAN-ID" of "C".

The wireless channel in the wireless communication protocol is determined by a device referred to as a root. In the case in FIG. 5, the communication node 102 (or a communication node upstream of the communication node 102, not illustrated) is the root. In this case, the communication node 101 communicates with the communication node 102 via the wireless channel "CH1", and also communicates with the communication node 501 via the network 112 through the same wireless channel "CH1". Accordingly, the communication node 101 is not required to switch the wireless channel on each opposite communication node, thereby allowing control to be simplified. In this case, the communication node 101 serves as a coordinator of the network 112.

Likewise, the communication node 501 communicates with the communication node 101 using the wireless channel "CH1". Meanwhile, the communication node 501 may select the same wireless channel "CH1" in the case of communication with the communication node 502 or the communication node 503 via the network 511. In this case, the communication node 501 serves as a coordinator of the network 511. FIG. 5 shows such situations.

Here, the networks 111, 112 and 511 share the wireless channel "CH1". Accordingly, for instance, if the communication node 501 and the communication node 502 frequently communicate with each other, the wireless channel "CH1" tends to be occupied. Thus, it is a matter of concern that the communication performances of the network 112 and the network 111 are reduced.

Figure 6:
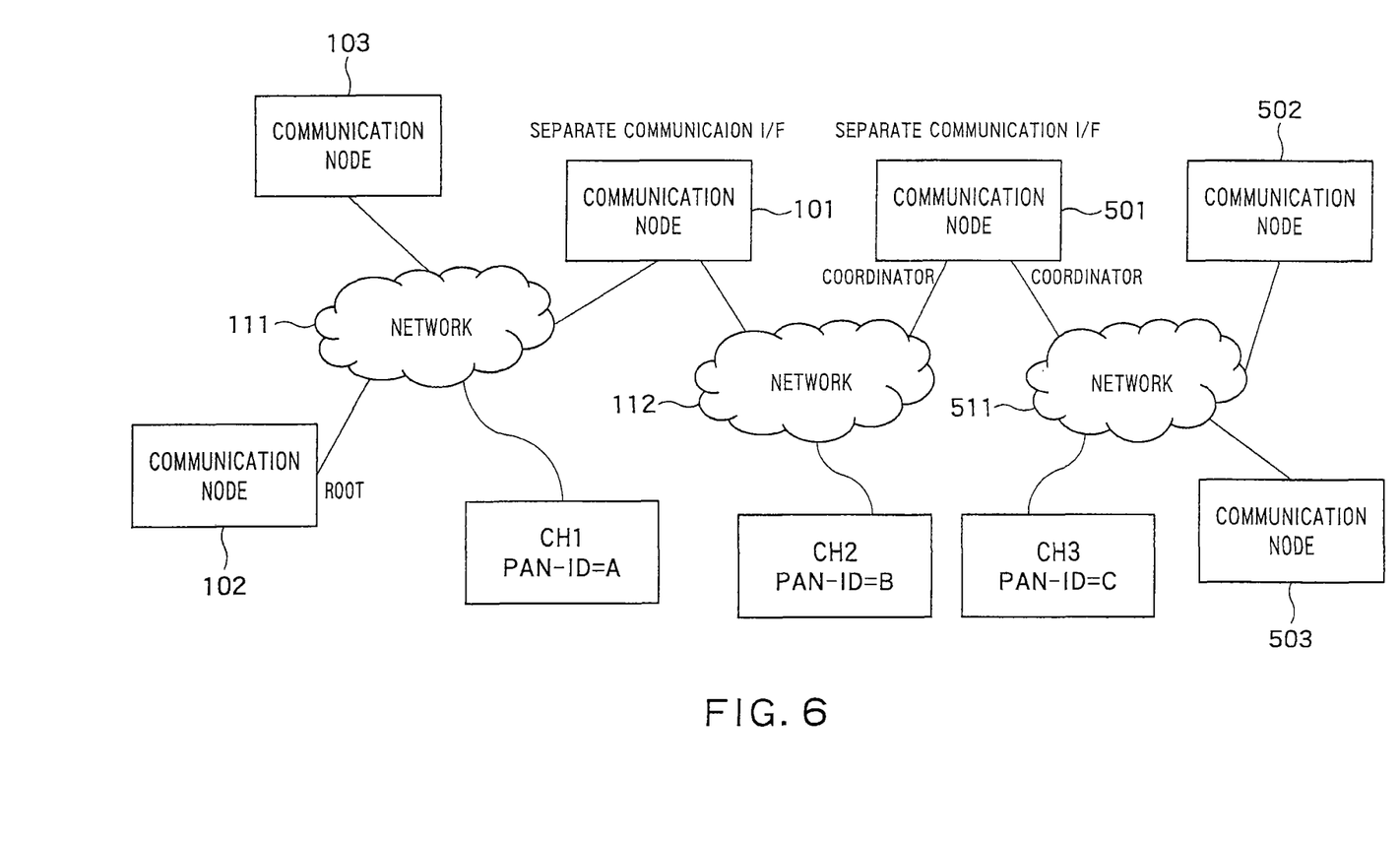
FIG. 6 is a diagram showing a yet another example of the network configuration.

FIG. 6 shows a configuration in the case where each of the communication nodes 101 and 501 has at least two communication interfaces. For instance, in the communication node 101, a communication interface connected to the network 111 and a communication interface connected to the network 112 exist in a physically separated manner.

In the configuration in FIG. 6, at least two communication interfaces in the communication node 101 or 501 can be separately controlled, which facilitates use of different wireless channels.

In this case, "CH1", "CH2" and "CH3", which are different from each other, can be used as the wireless channels used by the networks 111, 112 and 511, respectively. Accordingly, for instance, if the communication nodes 501 and 101 or the communication nodes 501 and 502 frequently communicate with each other, communication is performed via the wireless channels "CH2" and "CH3", which are different from the wireless channel "CH1". Thus, reduction in communication performance of the network 111 can be suppressed. In this case, the communication node 501 serves as a coordinator of the network 112 and also as a coordinator of the network 511.

In the case of connection via the network 112 and the communication node 101, the communication node 501 may change the communication frequency with the communication node 101 according to whether the own node is not the coordinator (in the case of FIG. 5) or is the coordinator (in the case of FIG. 6). More specifically, the communication frequency in the case where the own node is not the coordinator (in the case of FIG. 5) may be lower than that in the case where the own node is the coordinator (in the case of FIG. 6).

More specifically, in the case where the communication node 101 communicating via the network 112 is located at the boundary (e.g., a smart meter) between a network (utility domain) outside the home and a network (user domain) inside the home, it is preferable for the communication node 501 not to occupy the wireless channel of the network outside the home. Accordingly, in the configuration in FIG. 5, the method of reducing the communication frequency is particularly effective in comparison with the case where the own node is the coordinator as in FIG. 6.

In the configuration in FIG. 5, in the case where the communication node 101 is a device (e.g., smart meter) residing on a boundary and the network 112 and the network 511 use a common wireless channel, the communication node 501 may issues an instruction (message) requesting reduction in communication frequency to the communication nodes 502 and 503. This configuration allows the communication nodes 502 and 503 to communicate with the communication node 501 at a lower communication frequency than that in the case where the wireless channels of the networks 111, 112 and 511 are different from each other (the case of FIG. 6). Accordingly, reduction in communication performance in the network 112 and, in turn, in the network 111 can be prevented.

The communication device which has been heretofore described may also be realized using a general-purpose computer device as basic hardware. That is, each unit in the communication device can be realized by causing a processor mounted in the above described computer device to execute a program. In this case, the device may be realized by installing the above described program in the computer device beforehand or may be realized by storing the program in a storage medium such as a CD-ROM or distributing the above described program over a network and installing this program in the computer device as appropriate. Furthermore, the tables or the storages in the communication device may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device, comprising:
   a first communication layer receiving processor configured to perform a reception process on a first frame received from a first communication device with respect to a first communication layer, the first frame including a first header and data,
   the first communication layer receiving processor comprising:
      a first key identifier configured to identify a first key being a key required to process the data included in the first frame on basis of the first header in the first frame;

a first attribute identifier configured to read key data which represents association between the first key and first attribute information, and identify the first attribute information associated with the first key; and a data processor configured to process the data included in the first frame, using the first key, wherein the first communication layer receiving processor passes the data processed by the data processor and the first attribute information to a second communication layer processor which performs a process with respect to a second communication layer upper than the first communication layer.

2. The communication device according to claim 1, further comprising:

a first communication layer transmitting processor configured to perform a transmitting process with respect to the first communication layer, wherein a destination address, of the data included in the first frame, with respect to the second communication layer, indicates a second communication device, the first communication layer transmitting processor receives the data processed by the second communication layer processor and the first attribute information, from the second communication layer processor, the first communication layer transmitting processor comprises:

a second key identifier configured to identify a second key being a key for communication with the second communication device, on basis of at least one of the first header and an address of the second communication device with respect to the first communication layer;

a second attribute identifier configured to identify second attribute information associated with the second key in the key data, the key data representing further association between the second key and the second attribute information; and a determining unit configured to determine whether to transfer the data received from the second communication layer processor to the second communication device, on basis of a relationship between the first attribute information and the second attribute information, wherein the first communication layer transmitting processor transfers the data received from the second communication layer processor to the second communication device when it is determined to transfer the data.

3. The communication device according to claim 2, wherein the determining unit determines whether to transfer the data received from the second communication layer processor on basis of first communication layer policy data wherein the first communication layer policy data represents association among the first attribute information, the second attribute information and information on whether it is allowed to transfer the data received from the second communication layer processor to the second communication device.

4. The communication device according to claim 1, further comprising:

the second communication layer processor, wherein a destination address of the data included the first frame received from the first communication device with respect to the second communication layer is the own device, and the second communication layer processor identifies a data processing method on the data received from the first communication layer receiving processor according to the first attribute information, and processes the data according to the identified data processing method.

5. The communication device according to claim 4, wherein the second communication layer processor identifies the data processing method, on basis of second communication layer policy data representing association between the first attribute information and information on the data processing method.

6. The communication device according to claim 4, wherein the data processing method defines whether it is allowed to pass the data received from the first communication layer receiving processor an application program.

7. The communication device according to claim 2, wherein the second key identifier identifies the second key on basis of the address of the second communication device with respect to the first communication layer.

8. The communication device according to claim 1, wherein when the data received from the first communication device includes authentication data, the data processor verifies the authentication data using the first key.

9. The communication device according to claim 1, wherein when the data received from the first communication device is encrypted, the data processor decrypts the data using the first key.

10. The communication device according to claim 1, wherein the first communication layer is a network interface layer in a TCP/IP four-layer network model, and the second communication layer is an interne protocol layer in the TCP/IP four-layer network model.

11. A communication method, comprising:

performing a reception process on a first frame received from a first communication device with respect to a first communication layer, the first frame including a first header and data;

identifying by a first communication layer receiving processor a first key being a key required to process the data included in the first frame;

reading, by the first communication layer receiving processor, key data which represents association between the first key and first attribute information, and identifying the first attribute information associated with the first key;

processing by the first communication layer receiving processor the data included in the first frame, using the first key; and passing the data processed by the first communication layer receiving processor and the first attribute information to a second communication layer processor which performs a process with respect to a second communication layer upper than the first communication layer.

12. A non-transitory computer readable medium, having instruction stored therein which causes, when executed by a processor, to execute processing of steps comprising:

performing a reception process on a first frame received from a first communication device with respect to a first communication layer, the first frame including a first header and data;

identifying by a first communication layer receiving processor a first key being a key required to process the data included in the first frame;

reading, by the first communication layer receiving processor, key data which represents association between the first key and first attribute information, and identifying the first attribute information associated with the first key;

processing by the first communication layer receiving processor the data included in the first frame, using the first key; and passing the data processed by the first communication layer receiving processor and the first attribute information to a second communication layer processor which performs a process with respect to a second communication layer upper than the first communication layer.

\* \* \* \* \*